INVENTOR
Thomas Valle
BY
Ralph F. Crandell
ATTORNEY

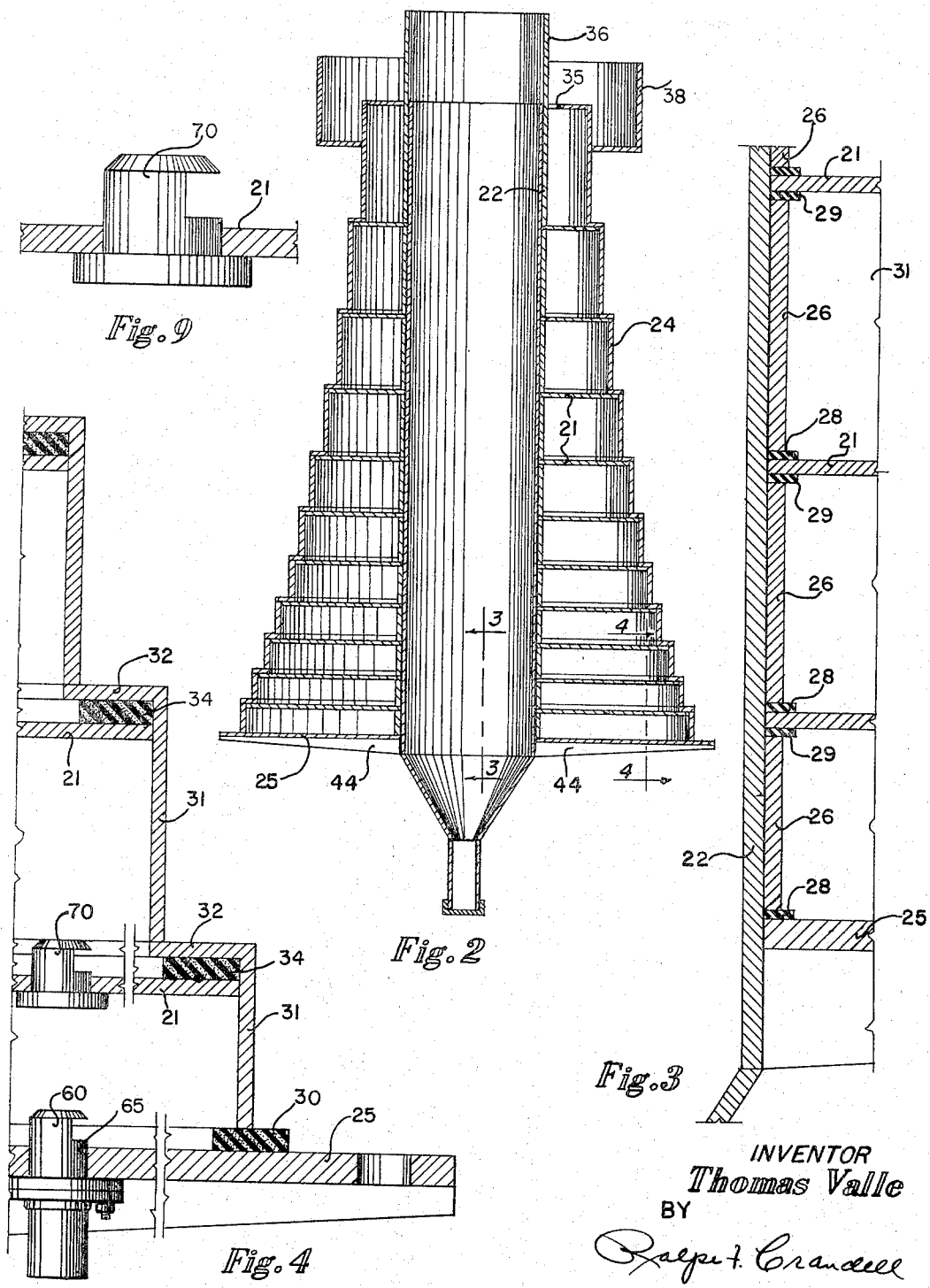

March 19, 1968  T. VALLE  3,373,984
APPARATUS FOR THE CONTINUOUS PRODUCTION OF COPPER
Filed Oct. 22, 1965  4 Sheets-Sheet 3
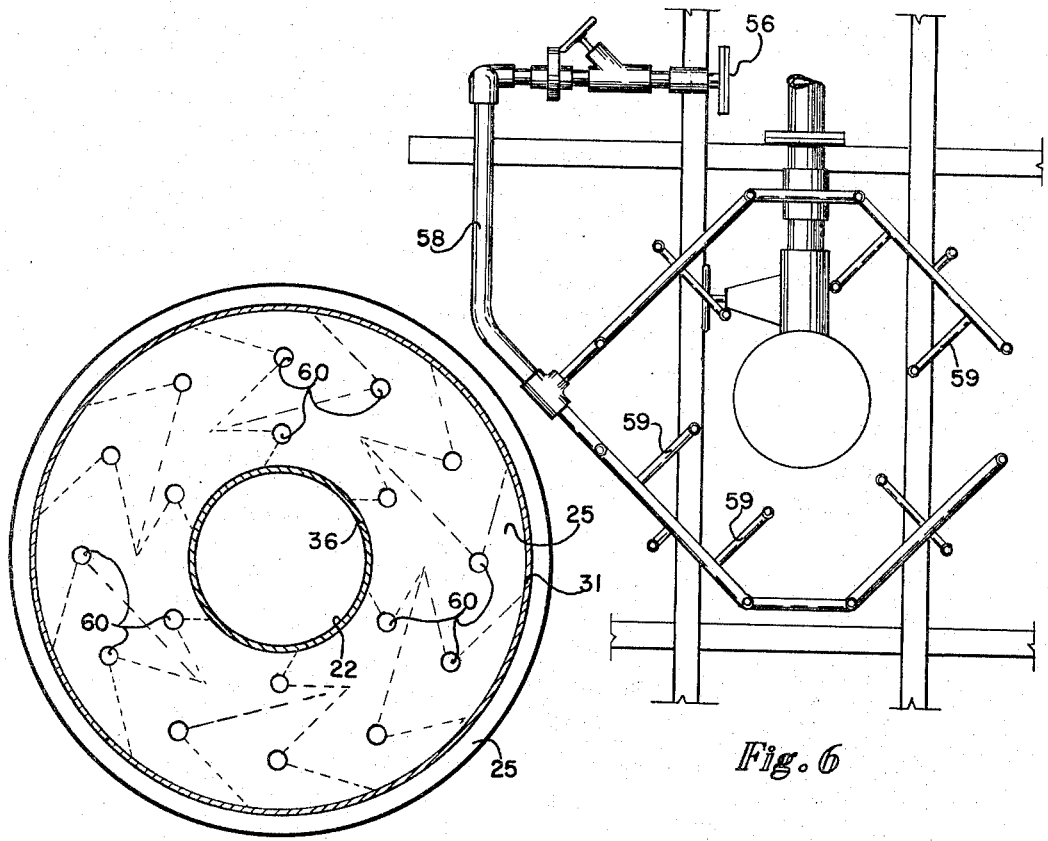
Fig. 6
Fig. 8
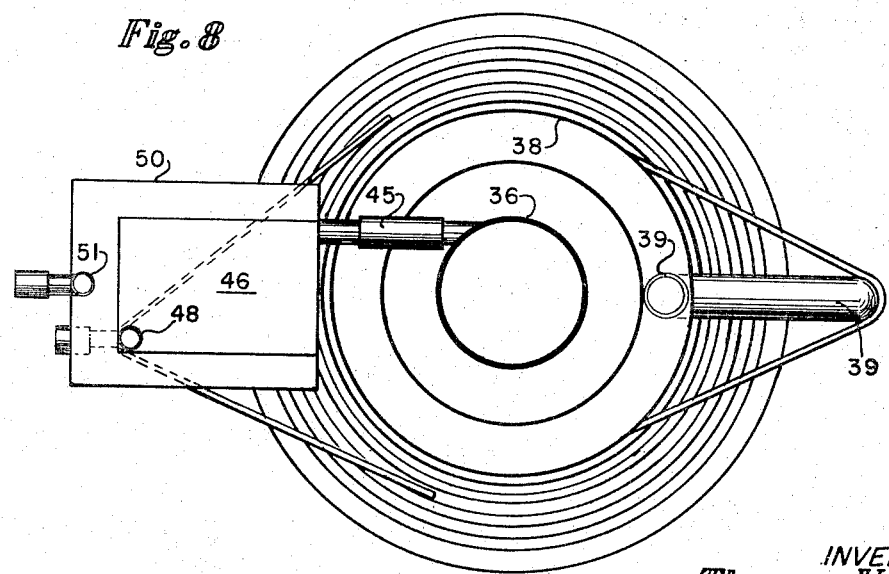
Fig. 5
INVENTOR
Thomas Valle
BY
Ralph F. Crandell
ATTORNEY

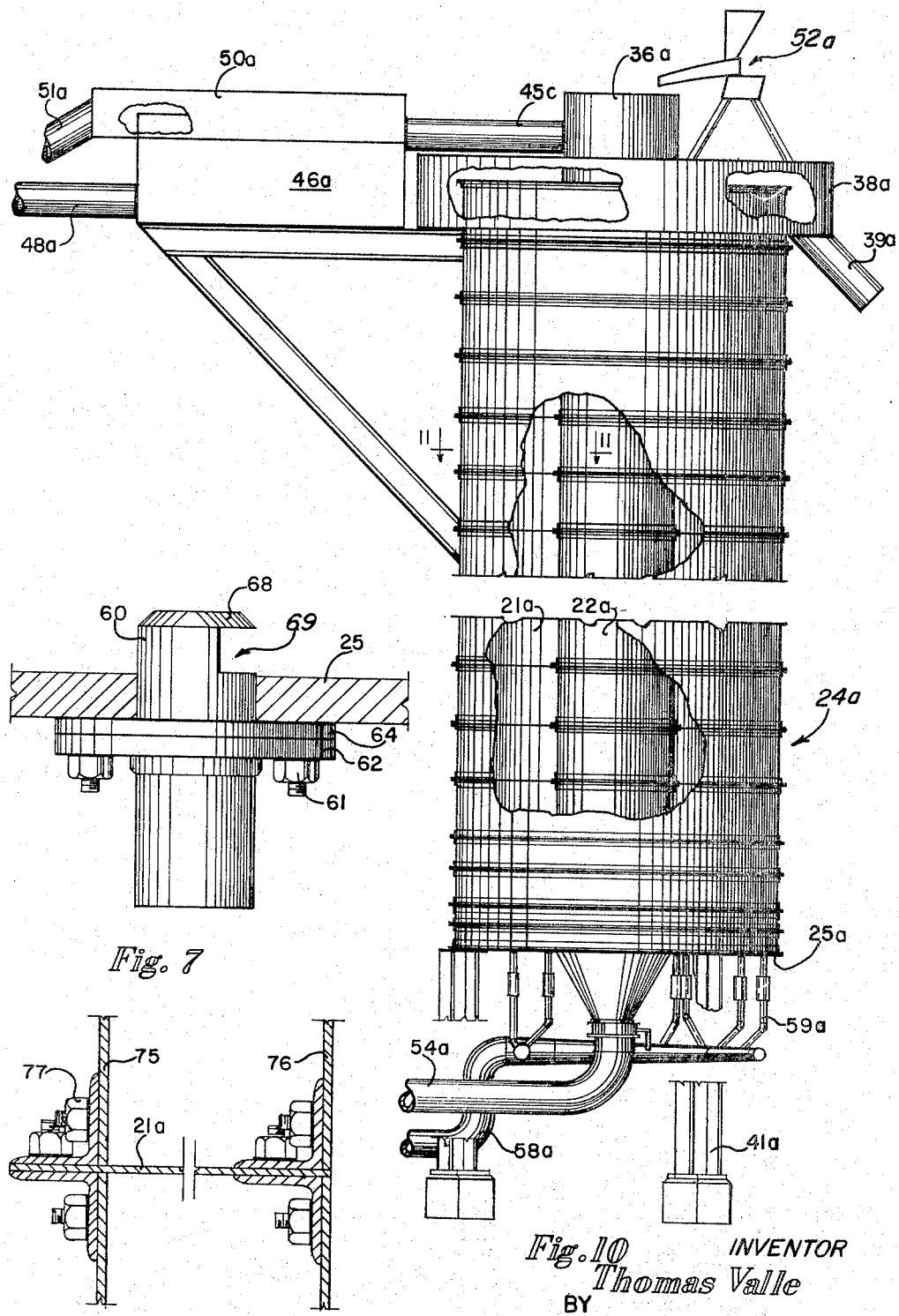

United States Patent Office 3,373,984
Patented Mar. 19, 1968

3,373,984
APPARATUS FOR THE CONTINUOUS PRODUCTION OF COPPER
Thomas Valle, Idaho Springs, Colo., assignor to The Fall River Exploration and Mining Company, Idaho Springs, Colo., a corporation of Colorado
Filed Oct. 22, 1965, Ser. No. 501,196
10 Claims. (Cl. 266—12)

ABSTRACT OF THE DISCLOSURE

The described apparatus for the continuous production of copper embodies a central vertical core member surrounded by a stack of spaced plates enclosed within a housing and defining a plurality of reaction chambers. The plates include a plurality of nozzles. A liquid-solid slurry is introduced into the top of the central core, flows downwardly through the core, and then upwardly through the reaction chambers. The nozzles direct the slurry into a swirling, mixing flow through each chamber.

---

This invention relates to apparatus for the continuous production of copper, and more particularly to an improved multiple-stage, vertical copper precipitation apparatus for use in connection with a process wherein a copper sulphate liquor is contacted with powdered or sponge iron particles to produce metallic copper.

In the production of copper, it is conventional practice to leach copper ore with sulphuric acid to produce a dilute, copper sulphate liquor. Metallic copper is then recovered from this liquor by a copper precipitation process utilizing an iron medium, to produce a ferrous sulphate solution and metallic copper. One form of such a process involves the production of a slurry of copper sulplate liquor and finely divided iron particles, and maintaining this slurry in agitation so that the iron comes into intimate contact with the solution and the exchange of metallic iron for metallic copper is achieved.

It is the principal object of the present invention to produce an improved apparatus for carrying out the continuous production of copper by a copper precipitation process.

Another object of the present invention is to provide a continuous copper precipitation apparatus which is inexpensively constructed, easily assembled, and susceptible of rapid and inexpensive maintenance and repair.

A further object of the present invention is to provide a copper precipitation apparatus of the foregoing character which is efficient in operation and capable of producing a maximum yield of copper.

The invention is shown in detail in the drawings wherein:

FIG. 2 is a section view taken substantially in the plane of line 2—2 of FIG. 1.

FIG. 3 is an enlarged fragmentary section view taken substantially in the plane of line 3—3 on FIG. 2.

FIG. 4 is an enlarged fragmentary section view taken substantially in the plane of line 4—4 on FIG. 2.

FIG. 5 is a plan view of the apparatus shown in FIG. 1.

FIG. 6 is a plan view of a manifold arrangement for feeding a slurry of copper containing liquor and powdered iron particles to the vertical continuous copper precipitation apparatus shown in FIG. 1.

FIG. 7 is an elevation view of a distributing nozzle utilized on the bottom plate of the apparatus for introducing slurry thereto.

FIG. 8 is a section view taken substantially in the plane of line 8—8 on FIG. 1 and illustrating the distribution of nozzles on hte bottom plate of the apparatus.

FIG. 9 is an elevation view of a nozzle of the type utilized on successive intermediate plates in the apparatus.

FIG. 10 is an elevation view, with parts cut away for clarity, of a modified form of vertical copper precipitation apparatus embodying the present invention.

FIG. 11 is a fragmentary section view taken substantially in the plane of line 11—11 on FIG. 10.

Figure 1:
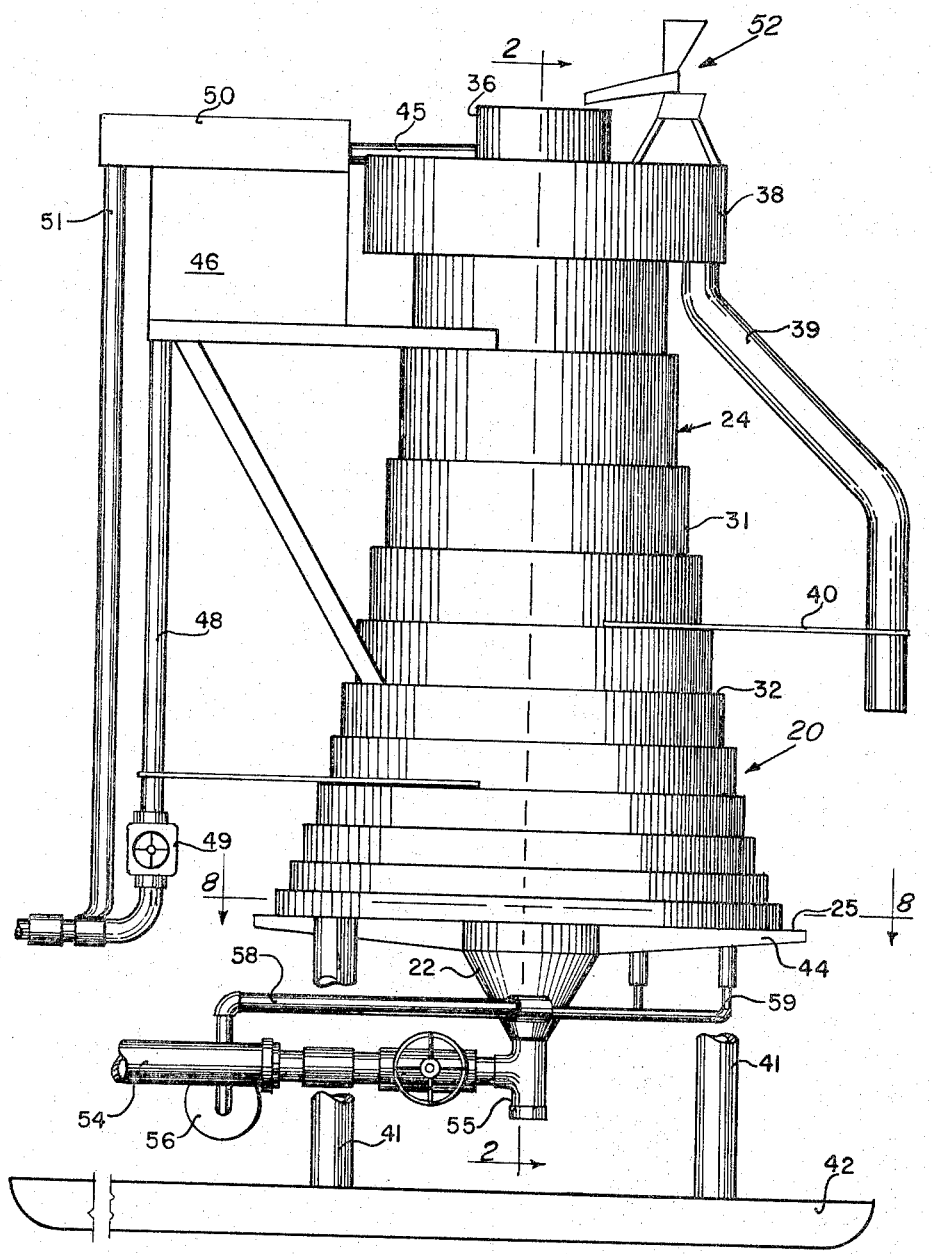
FIGURE 1 is an elevation view of one form of apparatus embodying the present invention and utilizing successive precipitation stage chambers stacked one on top of the other.

In carrying out a copper precipitation process in apparatus embodying this invention, dilute copper sulphate liquor is mixed with sponge or powdered iron particles in an amount calculated to effect the complete removal of the copper from the liquor. The resultant slurry must be maintained for a sufficient period of time to allow the reaction to be completed. For this purpose it is desirable that the slurry be continuously agitated so that the solid particles are maintained in suspension in the liquid thereby insuring a continuous contact between the particles and the liquid. The continuous precipitation apparatus embodying this invention and shown in the drawings achieves this purpose.

The precipitator shown in the drawings comprises a tower 20 having a plurality of annular plates 21 surrounding a central core 22 and enclosed within a housing 24. The lower-most plate 25 is welded to the core 22 and serves to support the superimposed intermediate plates 21 and the housing 24.

To facilitate assembly or disassembly of the stack, the plates 21 are of progressively small diameter as the stack rises so as to give a tree effect. Each plate, with the exception of the lower-most or bottom plate, which is permanently attached to the core 22, is removably mounted in the tree. To this end, a plurality of spacer sleeves 26 are telescopingly received over the core and, with interposed upper and lower gaskets 28, 29, support each successive plate 21 on the next lower plate. It will be observed that for purposes of maintaining a constant volume between each of the plates 21, as the plate diameter decreases, the spacing between the plates is proportionately increased by increasing the length of the corresponding spacer.

After the plates, spacers and interposed gaskets are in place on the core, the housing 24 is lowered into place and rests, again with an interposed gasket 30 on the bottom plate 25. To effectively seal each stage, the housing is formed in a series of steps with alternating vertical panels 31 and radial panels 32 welded together as an integral housing. The latter are provided on their under surfaces with annular gaskets 34 which rest on and sealingly engage the adjacent plates 21.

The uppermost radial panel 35 of the housing forms the top plate of the assembly and this panel terminates at its inner periphery in a spacer-like sleeve 36 which telescopingly surrounds the core 22 and forms an extension thereof. This sleeve 36 is sealed against the uppermost plate 21 in the stack by means of a suitable gasket 28.

Surrounding the upper radial panel of the housing, which serves as the upper plate of the stack, is an annular trough 38, which trough is welded to the vertical panel 31 supporting the plate 35. This trough in turn is provided with a liquor discharge outlet 39, which may be braced to the housing by a strut 40.

For supporting the column, the lower plate 25 is mounted on a frame composed of a plurality of legs 41 extending upwardly from a base or skid frame 42. Additionally the lower plate 25 is strengthened by radially extending ribs 44.

The liquor-iron powder slurry is introduced into the apparatus at the top of the core. Liquor is supplied through an inlet conduit 45 from a constant-head supply chamber 46 which is fed by a main supply conduit 48 controlled by an appropriate valve 49. The constant head of liquor is maintained by an overflow chamber 50 with a drain conduit 51 for returning excess liquor to the supply. Iron particles, such iron particles produced by the direct reduction of iron ore, are supplied to the core by a conventional vibratory feed mechanism 52 (FIG. 1) or other suitable constant particle feed device. The liquor and the iron particles are mixed in the central core which serves as a supply chamber for a slurry pump (not shown) which circulates the slurry through the column. At the bottom of the core the iron-liquor slurry is withdrawn through a conduit 54 to the inlet side of the slurry pump, which conduit may include a shut-off valve 55.

The outlet side of the slurry pump is connected to the feed conduit 56 of a slurry distributing manifold 58 (FIG. 6) from which manifold a plurality of feed conduits 59 lead to inlet nozzles 60 projecting through the lower or base plate 25. The nozzles are bolted or otherwise secured to the lower plates by bolts 61 extending downwardly from the plate 25 through a gasket 64 and a flange 62 on the nozzle. The inlet nozzles, an illustrative form of which is shown in FIG. 7, are constructed to flow the slurry over the plate 25 to produce a swirling action. To this end, the nozzles project through appropriately spaced holes 65 in the plate 25 and are provided with a lip 68 to form a radially opening jet aperture 69. These nozzles are distributed over the bottom plate 25 to achieve a uniform slurry flow and distribution, as shown in dotted lines in FIG. 8. When the chamber defined above the bottom plate is filled with slurry, the slurry then flows through nozzles 70 in the next superimposed plate 21, which nozzles are illustrated in FIG. 9 and are arrayed in plate 21, and successive plates, substantially as shown in FIG. 8. The nozzles 70 are similar to the nozzles 60, except that they are merely snapped in place in appropriate apertures in plate 21.

As the slurry flows upwardly through the column, it is throughly mixed and agitated in each stage chamber so that the iron particles are maintained in constant suspension and in contact with the liquor. If desired, additional fresh liquor may be introduced at spaced points in the column to enhance the copper precipitation reaction and insure that the iron particles are fully utilized. The upper plate 35 of the housing, constitutes the uppermost plate in the assembly, and contains similar nozzles or apertures so that slurry, flowing upwardly through the column, is collected in the tray 38 and flows out through the conduit 39 to a settling chamber (not shown) in which metallic copper and spent liquor are separated in a conventional manner.

A modified form of precipitating tower is illustrated in FIGS. 10 and 11, and in describing this modification, reference characters similar to those used above will be employed, where applicable, with the distinguishing suffix "a". In FIGURE 10, the apparatus there illustrated comprises a plurality of chambers, as described above, formed above a bottom plate 25a, by a housing 24a formed of outer walls 75 and inner core forming walls 76, each bolted to successively stacked spacer plates 21a, so that the inner walls 76 form a core 22a terminating in an upper portion 36a. As in the previous modification, copper sulphate liquor is fed to the core through a main supply conduit 48a leading to a constant head supply chamber 46a, surmounted by an overflow chamber 50a and connected to a liquor drain or return 51a. Liquor is supplied to the central core 22a from the constant head chamber 46a through a supply conduit 45a. At the same time, iron particles are fed to the core 22a by a vibratory feed mechanism 52a.

The slurry mixture formed in the central core 22a is fed to the inlet side of a slurry circulating pump (not shown) through an inlet conduit 54a and is discharged from the pump through an outlet conduit to a manifold 58a from which a plurality of feed conduits 59a lead to a plurality of nozzles, such as the nozzle shown in FIG. 7 located in the bottom plate 25a of the column 24a. As in the previously described modification, the slurry flows upwardly in the column through the nozzles in each of the plates 21a and the slurry is discharged from the column through discharge conduit 39a to a separating tank where the spent liquor is separated from precipitated copper.

The apparatus as described herein can be used with any form of iron particles such as sponge iron, iron filings or iron cuttings. The retention time in the apparatus has been found to be sufficient to effect a continuous and efficient copper precipitation without creating undue pressures or temperatures. By using the central core as a slurry supply source, adequate heat exchange is effected to remove any heat generated in the precipitation process.

While other forms and modifications will doubtless occur to those skilled in the art, it is my intention not to be limited by the foregoing disclosure but only by the scope of the appended claims.

I claim as my invention:

1. An apparatus for use in carrying out a continuous liquid-solid reaction comprising in combination, means defining a plurality of annular, vertically, adjacent, reaction chambers surrounding a central core, means for forming a liquid-solid slurry in said central core, and means for flowing said slurry from said central core serially upwardly through each of said reaction chambers whereby to maintain said slurry in a thoroughly mixed and agitated state.

2. An apparatus for use in carrying out a continuous liquid solid reaction as defined in claim 1, wherein each of said chambers is interconnected to the next vertically adjacent chamber by nozzles disposed to maintain a swirling flows of slurry through each of said chambers.

3. An apparatus for carrying out a continuous liquid-solid reaction comprising in combination a central hollow core, a plurality of spaced annular plates surrounding said core, each of said plates having a plurality of nozzles therethrough, a housing surrounding said plates and defining therewith a plurality of reaction chambers, serially interconnected by said nozzles, means for forming a liquid-solid slurry in said core, and means for directing said slurry serially upwardly through said chambers to maintain said slurry in a thoroughly mixed and agitated state.

4. An apparatus as defined in claim 3 wherein said nozzles are disposed to maintain a swirling flow of slurry through each of said chambers.

5. Apparatus for use in a continuous liquid-solid reaction process, comprising, in combination, means defining a plurality of superimposed annular chambers surrounding a central core, said means including a plurality of perforated plates separating said chambers, a plurality of nozzles in each of said perforated plates, means for supplying a liquid and a solid to said core to form a slurry therein, means for pumping said slurry from said core to the lower-most of said chambers, said nozzle means in each of said plates directing slurry from each of said chambers into the next higher chamber, and means for removing said slurry from the uppermost chamber, said chambers and nozzles being effective to maintain said slurry in a thoroughly mixed and agitated condition.

6. An apparatus for use in carrying out a continuous liquid-solid reaction comprising, in combination, a hollow core, a plurality of annular plates telescopingly received over said core, each said plate being of smaller diameter than the next lower plate, spacer sleeves separating said plates and supporting each plate on the next lower plate, each of said spacer sleeves being of increasing axial length with respect to the next lower sleeve, a housing enclosing said plates to define a plurality of chambers there-between, said chambers being of vertically decreasing outer radius and vertically increasing depth so that said chambers are each of equal volume, means for supplying a liquid-solid slurry interiorally of said core, means for introducing said slurry from said core into said vertically disposed chambers, and nozzle means interconnecting said vertically disposed chambers for passing said liquid-solid reaction slurry therethrough and for creating a swirling action of said slurry in each of said chambers.

7. A continuous liquid-solid reaction apparatus comprising, in combination, a frame, a fixed annular plate supported on said frame and having a core affixed to and extending upwardly from the inner edge of said plate, a series of annular intermediate plates telescopingly positioned on said core in vertically spaced relation to form a stack, a plurality of sleeve-like spacers telescopingly received on said core, each said spacer supporting a vertically juxtaposed annular intermediate plate on the next lower plate, each said plate being smaller than the next lower plate in said stack thereby forming a stepped stack, a housing enclosing said plates and said core, said housing having a plurality of spaced axially extending outer walls joined by a plurality of successively smaller radial annular walls thereby forming a stepped housing, said core, plates and housing defining a plurality of vertically superimposed chambers, a discharge trough surrounding the uppermost radial annular wall of said housing, means for supplying a liquid-solid slurry interiorally of said central core, said fixed plate having a plurality of nozzles affixed thereto and extending through said plate into the chamber defined thereabove, said nozzles being arranged to flow slurry over the surface of said plate, means for supplying slurry from said core to said nozzles so that said slurry is introduced into said chamber, each of said intermediate plates above said fixed plate having a plurality of openings therethrough, a nozzle in each of said openings, for directing slurry from the next lower chamber through said plates into the chamber thereabove, said nozzles being arranged to flow slurry over the upper surface of each said intermediate plate, and the radial annular plate at the top of said housing having a plurality of openings therethrough for directing slurry from the upper chamber in the stack into said discharge trough whereby said slurry is thoroughly mixed and agitated in each of said chambers to effect the desired liquid-solid reaction.

8. A liquid-solid reaction process apparatus as defined in claim 7 wherein each of the annular plates, spacers and housing walls are so proportioned that the chambers defined in said stack are of equal volume.

9. A liquid solid reaction apparatus as defined in claim 7 wherein annular gaskets are interposed between said spacers and annular intermediate plates and between said annular intermediate plates and said housing for sealingly enclosing each of said chambers.

10. A liquid solid reaction apparatus as defined in claim 7 wherein each of said nozzles are disposed to maintain a swirling flow of slurry through each of said chambers.

References Cited

UNITED STATES PATENTS

| 530,070 | 11/1894 | Ferry | 261—75 |
| 778,450 | 12/1904 | Guillaume | 261—75 XR |
| 1,403,723 | 1/1922 | Von Recklinghausen. | |
| 1,525,674 | 2/1925 | Thomas | 261—114 XR |
| 2,299,130 | 10/1942 | Dill | 261—76 |
| 2,818,324 | 12/1957 | Thornton | 23—267 |

FOREIGN PATENTS

| 24,402 | 4/1910 | Great Britain. |

J. SPENCER OVERHOLSER, *Primary Examiner.*

R. S. ANNEAR, *Assistant Examiner.*